(12) United States Patent
Wehlen et al.

(10) Patent No.: US 11,660,949 B2
(45) Date of Patent: May 30, 2023

(54) DRIVE DEVICE FOR AN ELECTRICALLY DRIVEN VEHICLE

(71) Applicant: ZF Friedrichshafen AG, Friedrichshafen (DE)

(72) Inventors: Timo Wehlen, Friedrichshafen (DE); Michael Roske, Friedrichshafen (DE); Sabine Sielemann, Deggenhausertal (DE); Wolfgang Rieger, Friedrichshafen (DE); Ulrich Kehr, Tettnang (DE); Eckhardt Lübke, Friedrichshafen (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 17/532,350

(22) Filed: Nov. 22, 2021

(65) Prior Publication Data
US 2022/0219520 A1 Jul. 14, 2022

(30) Foreign Application Priority Data
Jan. 14, 2021 (DE) .................... 10 2021 200 281.1

(51) Int. Cl.
*B60K 1/00* (2006.01)
*F16H 57/04* (2010.01)
(Continued)

(52) U.S. Cl.
CPC ........... *B60K 1/00* (2013.01); *F16H 37/0813* (2013.01); *F16H 57/0424* (2013.01);
(Continued)

(58) Field of Classification Search
CPC . B60K 1/00; B60K 2001/001; F16H 37/0813; F16H 57/0424; F16H 57/0441;
(Continued)

(56) References Cited

U.S. PATENT DOCUMENTS 5,718,300 A * 2/1998 Frost .................... F16H 37/082
180/65.6
6,973,982 B2 12/2005 Yoshikawa et al.
(Continued)

FOREIGN PATENT DOCUMENTS

DE 60200440 T2 9/2004
DE 102018210329 A1 1/2020
(Continued)

OTHER PUBLICATIONS

German Office Action DE 10 2021 200 281.1, dated Oct. 7, 2021. (18 pages) (Includes Stator; in Wikipedia (German)—Die freie Enzyklopädie; freigegeb.: Jul. 9, 2020; DOI: https://de.wikipedia.org/w/index.php?title=Stator&oldid=203479486).
Stator; in Wikipedia (English translation); Jul. 9, 2020; DOI: https://de.wikipedia.org/w/index.php?title=Stator&oldid=203479486).

*Primary Examiner* — Colby M Hansen
(74) *Attorney, Agent, or Firm* — Dority & Manning, P.A.

(57) ABSTRACT

A drive device (2) for an at least partially electrically driven vehicle (1) includes an electric machine (3) having a rotor shaft (8) extending longitudinally along an input axis (4). The drive device further includes a first output shaft (6a) extending longitudinally along an output axis (7) and parallel to the rotor shaft (8). Moreover, the drive device includes a gear stage (5) having a first gearwheel (9) rotationally fixed to the rotor shaft (8), and a second gearwheel (10) meshed with the first gearwheel (9) and drivingly connected to the first output shaft (6a). Additionally, the drive device includes a housing (11) having a shared housing cavity (12), wherein the first output shaft (6a) and the electric machine (3) are parallel to one another in the housing cavity (12), and wherein an air gap (18) extends radially between the electric machine (3) and the first output shaft (6a).

10 Claims, 2 Drawing Sheets

(51) Int. Cl.
  *F16H 57/021* (2012.01)
  *F16H 57/031* (2012.01)
  *F16H 37/08* (2006.01)
  *F16H 57/02* (2012.01)

(52) U.S. Cl.
  CPC .... *F16H 57/0441* (2013.01); *B60K 2001/001* (2013.01); *F16H 57/021* (2013.01); *F16H 57/031* (2013.01); *F16H 2057/02034* (2013.01); *F16H 2057/02052* (2013.01)

(58) Field of Classification Search
  CPC ................ F16H 57/021; F16H 57/031; F16H 2057/02034; F16H 2057/02052
  See application file for complete search history.

(56) References Cited

U.S. PATENT DOCUMENTS

| | | | |
|---|---|---|---|
| 8,932,166 B2 * | 1/2015 | Suzuki | B60K 1/00 475/5 |
| 10,538,238 B2 | 1/2020 | Swales et al. | |
| 2021/0129664 A1 | 5/2021 | Mepham et al. | |

FOREIGN PATENT DOCUMENTS

| | | |
|---|---|---|
| DE | 112018004167 T5 | 5/2020 |
| WO | WO 2020/001860 A1 | 1/2020 |

* cited by examiner

DRIVE DEVICE FOR AN ELECTRICALLY DRIVEN VEHICLE

CROSS-REFERENCE TO RELATED APPLICATION

The present application is related and has right of priority to German Patent Application No. 10 2021 200 281.1 filed on Jan. 14, 2021, the entirety of which is incorporated by reference for all purposes.

FIELD OF THE INVENTION

The invention relates generally to a drive device for an at least partially electrically powered or driven vehicle. The invention further relates generally to an at least partially electrically powered or driven vehicle having a drive device of this type.

BACKGROUND

DE 10 2018 210 329 A1 describes a prime mover for a vehicle, where the prime mover includes a first electric machine as a traction machine and a second electric machine as a traction machine, the generated torques of which are summed or combined via a summing transmission and directed onto a shared output shaft of the transmission. In addition, a first inverter is provided for electrically energizing the first electric machine and a second inverter separate from the first inverter is provided for electrically energizing the second electric machine. The transmission includes an intermediate shaft, which is coupled to two sub-transmissions. This intermediate shaft is drivingly coupled to the output shaft of the transmission via a further sub-transmission.

SUMMARY OF THE INVENTION

The present invention provides an installation space-saving drive device for a vehicle.

A drive device according to the invention for an at least partially electrically driven or powered vehicle includes an electric machine, which has a rotor shaft arranged on an input axis. The rotor shaft is drivingly connected via a gear stage to at least one first output shaft arranged on an output axis parallel to the rotor shaft. The gear stage includes a first gearwheel, which is rotationally fixed to the rotor shaft, and a second gearwheel, which is meshed with the first gearwheel and is drivingly connected to the particular output shaft, wherein the particular output shaft and the electric machine are arranged parallel to one another in a shared housing cavity of a housing of the drive device, and wherein an empty intermediate space is formed radially between the electric machine and the particular output shaft. In other words, no further component, such as a housing component or a housing section, is arranged in the housing cavity radially between the electric machine and the particular output shaft. Rather, an air gap, in which no further component is arranged, is formed spatially between the electric machine, particularly the stator housing of the electric machine, and the particular output shaft. Consequently, the output shaft is integrated in the housing cavity together with the other components of the drive device over the entire axial extension of the electric machine, wherein the electric machine and the output shaft extend through the housing cavity in parallel to one another in the axial direction. Therefore, the housing wall is not arranged radially between the output shaft and the electric machine, but rather surrounds the electric machine and the particular output shaft in the radial direction. Due to the omission of a housing wall between the particular output shaft and the electric machine, and due to the displacement of the housing wall radially outward while simultaneously integrating the output shaft into the housing cavity, the input axis and the particular output shaft are arranged radially closer to the electric machine, and so the center distance between the input axis and the output axis is reduced and, consequently, radial installation space of the drive device is saved. This has the advantage that a transmission ratio of the gear stage is increased while the differential diameter remains the same. In other words, the diameter of the first gearwheel, i.e., the pinion of the gear stage, is reduced while the differential diameter remains the same and/or the diameter of the second gearwheel remains the same and axes move closer to one another. This reduces the number of teeth and the pitch circle diameter, which, conversely, increases the ratio achievable with the gear stage. As the ratio increases, a second gear stage, which would be provided in order to increase the ratio, is omitted, such that axial installation space of the drive device is saved and the drive device is, overall, more cost-effective and simpler. The diameter of the first gearwheel is preferably smaller than the diameter of the second gearwheel.

A parallel arrangement of the input axis with respect to the output axis or of the rotor shaft with respect to the particular output shaft is understood to be an essentially axially parallel arrangement, in which a slight deviation of an exactly parallel arrangement of the components of the drive device or of the axes with respect to one another is also a parallel arrangement and, thereby, is included in the scope of protection of the invention. Thus, in some embodiments, the rotor shaft and the particular output shaft are slightly slanted with respect to one another.

The first gearwheel of the gear stage is rotationally fixed to the rotor shaft and, thereby, rotationally fixed to a rotor of the electric machine, which is rotatable relative to a stator. In a rotor mode, the rotor shaft acts as an output shaft of the electric machine. The rotor shaft, including the first gearwheel arranged thereon in a rotationally fixed manner, is the input shaft of the gear stage in the rotor mode of the electric machine. In the rotor mode of the electric machine, electrical energy, for example, from an energy accumulator, in particular a battery, is supplied to the electric machine, which, as a result, brings about a rotation of the rotor and the rotor shaft in order to generate an input or drive power, wherein the drive power is provided for rotationally driving the first gearwheel. The particular output shaft of the drive device functions as the output shaft of the gear stage and is at least indirectly drivingly connected to the second gearwheel of the gear stage. The particular output shaft transmits the drive power onto a wheel of the vehicle, which is at least indirectly drivingly connected to the particular output shaft.

In a generator mode of the electric machine, the particular output shaft functions at least indirectly as the input shaft of the gear stage, whereas the rotor shaft of the electric machine is therefore the output shaft of the gear stage. A drive power of the vehicle is guided via the gear stage into the electric machine, and so electrical energy is generated with the electric machine, which is supplied to a battery for storage. In the generator mode, the power is introduced into the electric machine, for example, from one or several rotating wheel(s) of the vehicle via the gear stage.

The term "at least indirectly" is understood to mean that two components are connected to each other via at least one further component, which is arranged between the two components, or are directly and, thereby, immediately connected to each other. Consequently, even further components are arranged between shafts or gearwheels, which are operatively connected to the shaft or to the gearwheel.

A shaft, whether it be a rotor shaft, an output shaft, or the like, is understood, within the meaning of the invention, to be a rotatable component of the drive device for transmitting torques, via which particular associated components of the drive device are connected to each other in a rotationally fixed manner.

The gear stage is preferably a single stage and is a reduction gear. The gear stage has a transmission ratio of greater than 1, or i>1. Due to the reduction gear, an input speed of the electric machine is reduced. In other words, the rotational speed of the rotor shaft is greater than the rotational speed of the particular output shaft operatively connected thereto. In particular, the gear stage is a spur gear stage, and so the first gearwheel and the second gearwheel are both spur gears, as the result of which a necessary axial installation space of the gear stage is minimized. Due to the single-stage of the gear stage, furthermore, intermediate shafts and associated bearings and seals are omitted, as the result of which axial installation space is additionally saved.

The rotor shaft, the gearwheels of the gear stage, and the particular output shaft are rotatably mounted in the housing by bearing elements. Depending on how great or larger the acting forces are and in which direction they act, the bearing elements are pure radial bearings, pure axial bearings, and/or bearings that transmit radial forces as well as axial forces.

Preferably, the rotor shaft is drivingly connected to a differential via the gear stage, wherein the differential distributes a drive power to the first output shaft and a second output shaft. In other words, two output shafts, rather than one output shaft, are provided in the drive device. The differential is arranged, together with the electric machine and the gear stage, in the shared housing cavity of the housing. Preferably, the differential is a bevel gear differential. Moreover, other alternative embodiments of the differential are also conceivable, for example, as a spur gear differential or a planetary differential.

The two output shafts are preferably arranged coaxially to the output axis. Via the particular output shaft, at least one wheel of the vehicle is at least indirectly rotationally driven by the drive power generated by the electric machine drivingly connected thereto and by the drive power converted with the gear stage. One of the drive shafts extends, starting from the gear stage, parallel to the electric machine in the above-described manner and, thereby, is arranged radially next thereto. The particular other output shaft extends, starting from the differential and the gear stage, in the opposite direction.

Preferably, the second gearwheel of the gear stage is a differential gear of the differential. Therefore, the second gearwheel combines the functions of the gear stage and the functions of the differential. The second gearwheel of the gear stage therefore transmits a drive power from the first gearwheel into the differential, wherein the second gearwheel simultaneously interacts with further gearwheels and/or shafts of the differential, for example, with differential bevel gears of the differential, in order to distribute the drive power accordingly to the output shafts.

According to one exemplary embodiment of the invention, the first output shaft is mounted in the area of a passage through the housing by a first bearing element so as to be rotatable with respect to the housing. In other words, the first bearing element is arranged at the main housing of the drive device in order to rotatably mount the first output shaft, i.e., the output shaft arranged radially next to the electric machine, at the housing. The assembly of the components of the drive device in the housing cavity takes place in this case, for example, through a housing opening at the housing formed on an axially opposite side or through at least one housing opening at the housing laterally with respect to the output axis. The particular housing opening acts, in particular, as an assembly opening, through which an assembly, disassembly, or maintenance of the components of the drive device, in particular of the electric machine, of a power electronics unit possibly arranged in the housing cavity, of the gear stage, and of the particular output shaft, is possible.

Alternatively, the housing cavity is spatially delimited by a housing cover, wherein the first bearing element is arranged at the housing cover. In other words, the first bearing element is integrated at the housing cover, wherein the housing cover spatially delimits the housing cavity on sides of the electric machine in the axial direction. In addition to this housing cover, further housing covers are provided, which radially and/or axially spatially delimit the housing cavity and simplify an assembly and/or maintenance of the drive device. Moreover, housing covers also have axial breakthroughs, through which, for example, the rotor shaft or the particular output shaft are axially guided.

The housing cover or the housing covers is/are connectable to the housing, in particular in a form-locking manner. A form-locking connection includes positioning guides, for example, complementarily formed raised areas and indentations, for the initial positioning and simplified assembly of the housing. Moreover, in some example embodiments, the housing parts are detachably connectable to each other, in particular bolted to each other. In some example embodiments, the housing also consists of one or multiple housing segment(s), which form the main housing and are form-lockingly connectable to each other. The housing cover or the housing covers is/are form-lockingly connectable, in particular boltable, to the housing or to one or multiple housing segment(s) of the housing. The necessary number of housing parts is reduced due to a suitable arrangement of the components of the drive device with respect to one another and in the housing cavity.

The drive device is cooled and/or lubricated in different ways. It is conceivable, for example, to provide an air cooling and/or oil cooling and/or water cooling of the electric machine, wherein, in particular, the stator housing accommodating the stator of the electric machine has appropriate air ducts or oil ducts or water lines in order to cool the stator. In addition, a lubrication and/or cooling of the gear stage and/or of the electric machine takes place by a lubricant and/or coolant.

According to one exemplary embodiment of the invention, a collecting chamber is provided for a coolant and/or lubricant, which is fluidically connected to the housing cavity. The collecting chamber is directly or indirectly connected, for example, via fluid lines, to the housing cavity, wherein a passive and/or active lubrication and/or cooling of the electric machine, of the gear stage, of the differential or further components of the drive device to be cooled and/or lubricated takes place via the cooling chamber. The collecting chamber is, for example, directly connected to an oil pan, into which the second gearwheel of the gear stage protrudes in order to plunge into a lubricant.

Preferably, in one example embodiment, a pump is arranged in the collecting chamber and delivers the coolant and/or lubricant. Via the pump, in particular, an active lubrication and/or cooling of the drive device is implementable, wherein the pump delivers a lubricant and/or coolant to an arbitrary point of the housing cavity. In particular, the pump is connectable, via appropriate guide ducts, at least indirectly fluidically to a stator housing, in particular to a cooling system of the electric machine formed in the stator housing, to the rotor shaft, to the gearwheels of the gear stage, to the particular output shaft and/or to bearing elements of the drive device, in particular bearing elements of the rotor shaft, of the gearwheels, of the differential, and/or of the particular output shaft. The pump is, for example, an oil pump for delivering a lube oil.

Preferably, the collecting chamber is fluidically connected to at least one guide duct formed at the housing. The guide duct is fluidically connected, for example, to the pump and, thereby, deliver a coolant and/or lubricant for lubrication and/or cooling. The pump delivers the lubricant and/or coolant via a particular guide duct to the appropriate point of the housing cavity. Alternatively, the guide duct delivers a collected or combined amount of coolant and/or lubricant to the collecting chamber. Multiple guide ducts, which distribute or combine a coolant and/or lubricant in a suitable way via the guide ducts, are combinable to form a duct system. Moreover, it is conceivable that the particular guide duct extends through multiple segments of the housing, wherein, for example, a guide duct in a housing cover is unambiguously assignable to a guide duct in a housing segment or in the main housing. In this sense, a guide duct is arranged, furthermore, in or at the housing cover.

Moreover, the guide duct is preferably formed at an internal shell of the housing in the area of the first output shaft. The particular guide duct is formed at the internal shell or at the inner surface of the housing facing the housing cavity, in particular as a flute, groove, or longitudinally extending indentation, such that a lubricant and/or coolant is collected by the guide duct, as described above, and appropriately routed to the collecting chamber.

The drive device according to the invention is usable in vehicles driven under purely electric motor power and, similarly, in vehicles driven in a hybrid manner, which are drivable partially under electric motor power and partially by a separate internal combustion engine. Preferably, the drive device is arranged transversely to the vehicle longitudinal axis. Depending on the design and number of driven axles, in some example embodiments, the vehicle also includes two or more drive devices of this type, wherein one axle, multiple axles, or all axles of the vehicle are equipped with the particular drive device according to the invention and, as a result, are drivable. The vehicle is preferably a motor vehicle, in particular, in particular an automobile (for example, a passenger car having a weight of less than 3.5 t), a bus, or a truck (bus and truck, for example, having a weight of over 3.5 t).

The definitions presented above and comments presented regarding technical effects, advantages, and advantageous embodiments of the drive device according to the invention also apply similarly for the at least partially electrically driven vehicle according to the invention.

It is understood that features of the approaches presented above and/or described in the claims and/or figures may also be combined in order to be able to implement, cumulatively, the advantages and effects achievable in the present case.

BRIEF DESCRIPTION OF THE DRAWINGS

Exemplary embodiments of the invention are explained in greater detail in the following with reference to the diagrammatic drawings, wherein identical or similar elements are labeled with the same reference numbers, wherein.

DETAILED DESCRIPTION

Figure 1:
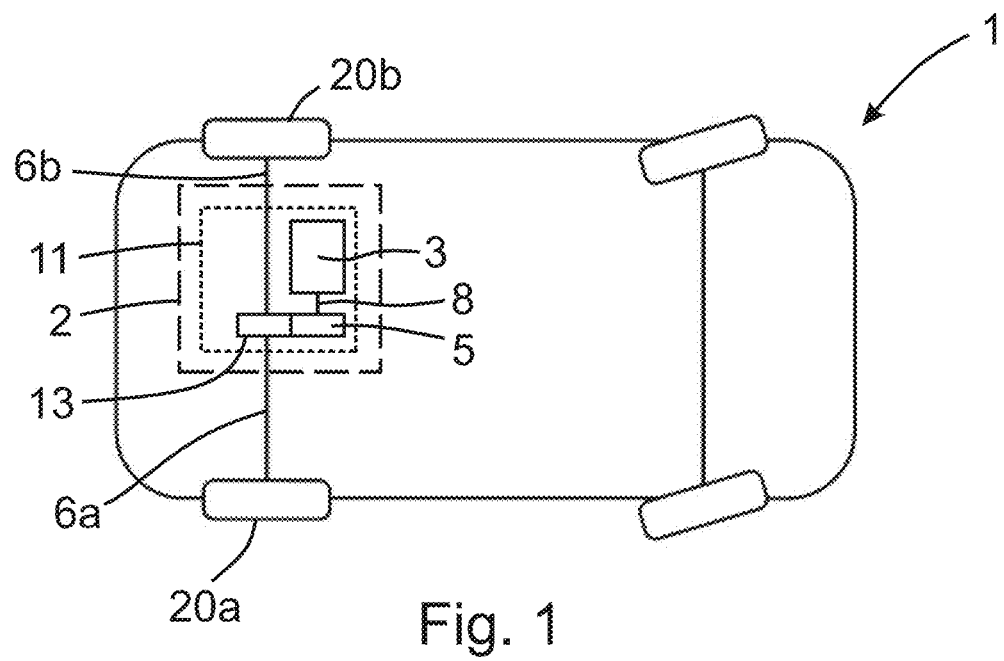
FIG. 1 shows a schematic top-down view of a vehicle including a first embodiment of a drive device according to the invention.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1 shows an electrically driven vehicle 1 including a drive device 2 according to the invention, according to a first embodiment. The drive device 2 includes an electric machine 3, which generates a drive power and transmits the drive power via a gear stage 5 onto a differential 13. The differential 13 distributes the drive power to a first output shaft 6a and a second output shaft 6b. Each output shaft 6a, 6b is drivingly connected to a respective wheel 20a, 20b of the vehicle 1.

The electric machine 3 is connected to a power electronics unit (not shown here) electrically and in terms of control, with the power electronics unit and the electric machine 3 being connected to an energy accumulator (also not shown here). In a reverse power flow and/or in a generator mode of the electric machine 3, the energy accumulator is supplied with electrical energy. The energy accumulator is, for example, a battery, or the like. Via the electric machine 3, in the generator mode, electrical energy is generated, stored, and reserved for a re-supply of the electric machine 3.

Figure 2:
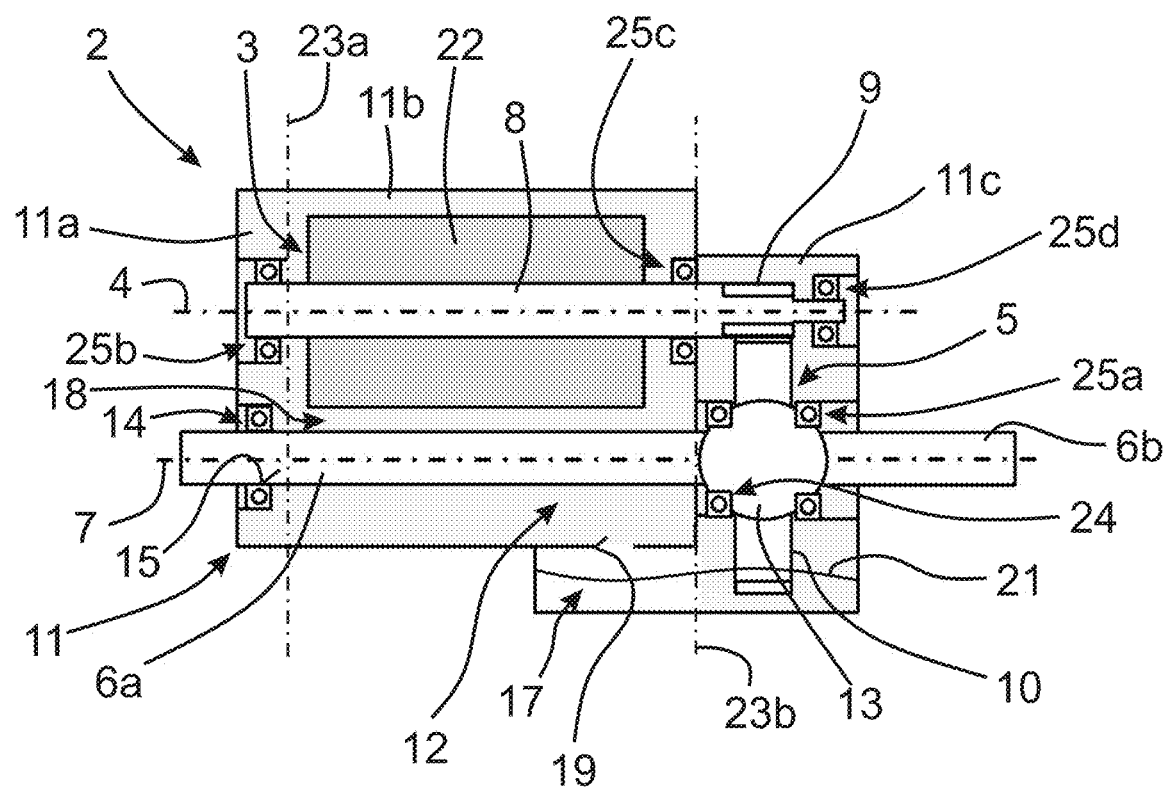
FIG. 2 shows a schematic section view of the first embodiment of the drive device according to the invention, according to FIG. 1.

The first exemplary embodiment of the drive device 2 is represented in detail in FIG. 2. In the present case, it is shown that the electric machine 3 includes a stator 22 arranged on an input axis 4 with a rotor shaft 8, with the rotor shaft 8 being arranged radially within the stator 22 and being rotationally drivable. The rotor shaft 8 is integrally connected to a first gearwheel 9 of the gear stage 5, with the first gearwheel 9 also being arranged coaxially to the input axis 4. The first gearwheel 9 acts as a pinion of the gear stage 5 and is meshed with a second gearwheel 10 arranged on an output axis 7. The first gearwheel 9 has a smaller diameter than the second gearwheel 10. The second gearwheel 10 simultaneously forms a differential gear of a differential 13 arranged in the power flow downstream from the gear stage 5. A drive power of the electric machine 3 is converted via the gear stage 5 having a transmission ratio greater than 1, or i>1, guided into the differential 13, where the differential 13 distributes the converted drive power to the two output shafts 6a, 6b.

The differential 13 is not represented in detail in the present case. In any case, the drive power is distributed via the second gearwheel 10, which is a differential gear in the present case, to the two output shafts 6a, 6b in a suitable way and a torque and a rotational speed are appropriately transmitted. The two output shafts 6a, 6b are arranged, together with the differential 13, coaxially to one another on the output axis 7, the output axis 7 extending parallel to the input axis 4.

The electric machine 3, the gear stage 5, and a portion of the output shafts 6a, 6b are arranged in a shared housing cavity 12 of a housing 11 of the drive device 2. In the present case, the housing 11 includes three single parts, which are at least form-lockingly connected to each other, in particular bolted to each other, in a manner not shown in greater detail. The housing 11 includes, in the present case, on the one hand, a first housing segment 11b for accommodating the electric machine 3 and a portion of the first output shaft 6a as well as a second housing segment 11c for accommodating the gear stage 5 with the gearwheels 9, 10. The first housing segment 11b is axially closed on one side by a housing cover 11a, which, at a first parting plane 23a, comes to rest axially against the first housing segment 11b and is sealingly attached thereto. At an opposite side of the first housing segment 11b, the second housing segment 11c comes to rest axially against a second parting plane 23b. Similar to the housing cover 11a, the second housing segment 11c is attached to the first housing segment 11b. Consequently, the first housing segment 11b is arranged axially between the housing cover 11a and the second housing segment 11c and is sealingly attached thereto.

The first output shaft 6a and the electric machine 3 are arranged parallel to one another in the shared housing cavity 12 of the housing 11 of the drive device 2, wherein an empty intermediate space 18 is formed radially between the electric machine 3 and the first output shaft 6a. In other words, no further component, such as a further housing component or a further housing section, is arranged in the housing cavity 12 radially between the electric machine 3 and the first output shaft 6a. Therefore, the first housing segment 11b radially accommodates the electric machine 3, including the stator 22 and the rotor shaft 8, and the first output shaft 6a. Therefore, the intermediate space 18 is understood to be an air gap, which is present radially between the stator 22 and the first output shaft 6a. The smaller the air gap or the radial intermediate space 18 is, under consideration of the component dimensions of the electric machine 3 and of the first output shaft 6a, the more closely are the output axis 7 and the input axis 4 positioned with respect to one another in the radial direction. As a result, the first gearwheel 9 is smaller, in particular having a smaller pitch circle diameter and a smaller number of teeth, relative to a pitch circle diameter and a number of teeth of the second gearwheel 10, so a higher ratio is implementable with the gear stage or ratio 5.

The first output shaft 6a is mounted so as to be rotatable with respect to the housing 11 via a first bearing element 14 and a second bearing element 24. In the present case, the first bearing element 14 is arranged in the area of a passage 15 through the housing cover 11a of the housing 11, through which the first output shaft 6a is guided out of the housing 11. Consequently, the first bearing element 14 is arranged in the first housing cover 11a. Alternatively, it is conceivable that, when a housing cover 11a is not provided, the first bearing element 14 is arranged directly at the first housing segment 11b or at the main housing of the drive device 2.

The second output shaft 6b is rotatably mounted, in the present case, via a third bearing element 25a in the second housing segment 11c and is guided out of the housing 11 at a side of the housing 11 axially opposite the passage 15. The rotor shaft 8 is mounted so as to be rotatable with respect to the housing 11, in the present case, via a fourth bearing element 25b, which is also arranged in the housing cover 11a, a fifth bearing element 25c, which is arranged in the first housing segment 11b, and a sixth bearing element 25d, which is arranged in the second housing segment 11c. The bearing elements 14, 24, 25a, 25b, 25c, 25d are grooved ball bearings in the present case, which transmit radial forces as well as axial forces. The selection and dimensioning of the bearing elements 14, 24, 25a, 25b, 25c, 25d takes place as a function of the arising loads and their direction of action in the drive device 2.

The drive device 2 includes, furthermore, a collecting chamber 17 in the direction of gravity underneath the first housing segment 11b, which is fluidically connected to the housing cavity 12 and is provided for collecting and reserving a lubricant 21. Consequently, the collecting chamber 17 is an oil pan or as an oil sump. The lubricant 21 is, for example, a lube oil. The collecting chamber 17 is fluidically connected to the housing cavity 12 in order to implement a passive lubrication and cooling of the gear stage 5. For this purpose, the second gearwheel 10 of the gear stage 5 plunges into the lubricant 21 and, as a result, lubricates the meshing of teeth of the second gearwheel 10 with the first gearwheel 9 and, supported by centrifugal forces, also lubricates the surrounding bearing elements 14, 24, 25a, 25b, 25c, 25d, and the rotor shaft 8 within the stator 22. Due to the fact that no further components are arranged radially between the first output shaft 6a and the electric machine 3, lubrication is additional improved, wherein an additional lubrication, for example, of the bearing elements 14, 24, 25a, 25b, 25c, 25d, is then omitted. The collecting chamber 17 is fluidically connected to the housing cavity 12 via a guide duct 19 in order to return the lubricant 21 into the collecting chamber. The guide duct 19 is a radial breakthrough in the present case.

Figure 3:
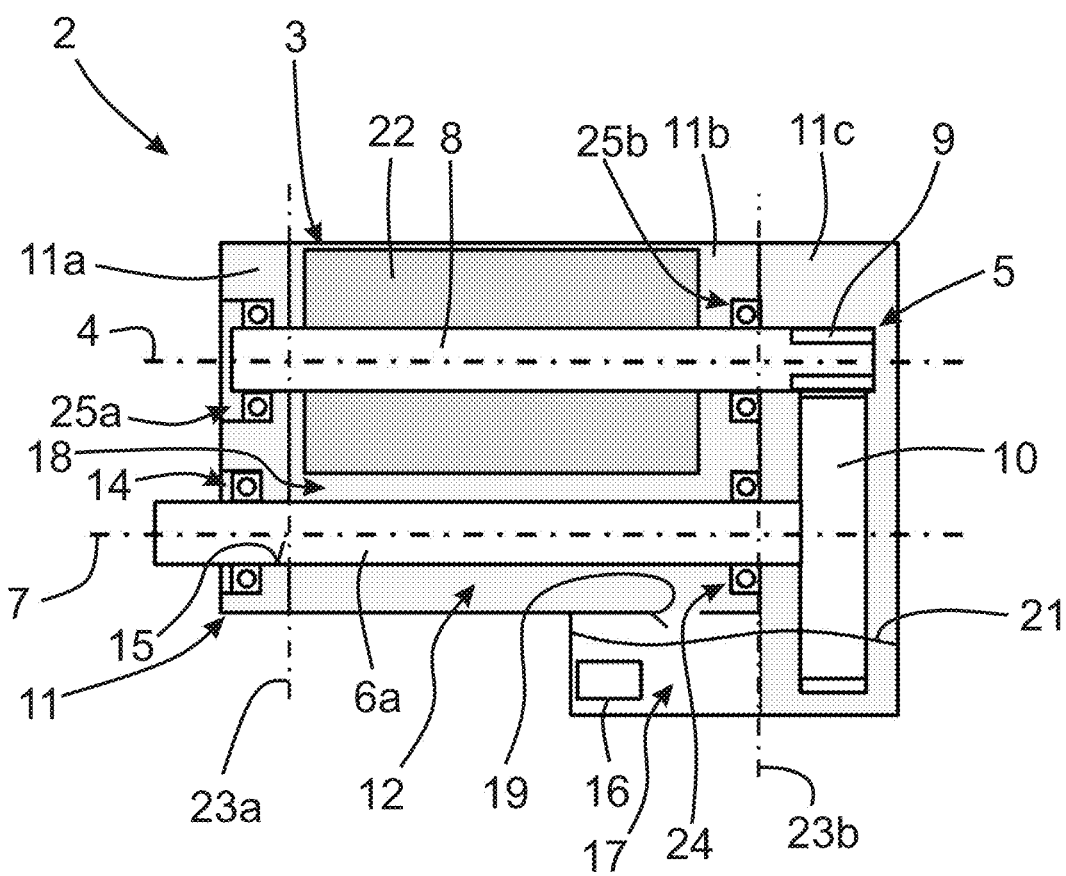
FIG. 3 shows a schematic section view of a second embodiment of the drive device according to the invention.

According to FIG. 3, a second exemplary embodiment of the drive device 2 is represented, wherein the drive device 2 of FIG. 3, in contrast to FIG. 1 and FIG. 2, is provided for driving a single wheel 20a of the vehicle 1. Correspondingly, the second gearwheel 10 is rotationally fixed only to a first output shaft 6a. A second output shaft 6b and a differential 13 are not provided in this exemplary embodiment. Otherwise, the electric machine 3, the rotor shaft 8, the gear stage 5, and the first output shaft 6a are essentially the same as or similar to FIG. 1 and FIG. 2.

For instance, the electric machine 3, the gear stage 5, and a portion of the first output shaft 6a are arranged in the shared housing cavity 12 of a housing 11 of the drive device 2. In the present case, the housing 11 includes three single parts, which are at least form-lockingly connected to each other, in particular bolted to each other, in a manner not shown in greater detail. The housing 11 includes, in the present case, on the one hand, a first housing segment 11b for accommodating the electric machine 3 and the first output shaft 6a. The first housing segment 11b is axially closed on one side by a housing cover 11a, which, at a first parting plane 23a, comes to rest axially against the first housing segment 11b and is sealingly attached thereto. At an opposite side of the first housing segment 11b, a second housing segment 11c is a housing cover which comes to rest axially in the area of a second parting plane 23b. The second housing segment 11c is attached similarly to the housing cover 11a. The second housing segment 11c accommodates the gear stage 5. Consequently, the first housing segment 11b is arranged axially between the housing cover 11a and the second housing segment 11c and is sealingly attached thereto.

The first output shaft 6a and the electric machine 3 are arranged in parallel to one another in the shared housing cavity 12 of the housing 11 of the drive device 2, wherein an empty intermediate space 18 is formed radially between the electric machine 3 and the first output shaft 6a. Reference is made to the description of FIG. 2 with respect to the intermediate space 18 or the air gap radially between the first output shaft 6a and the electric machine 3.

The first output shaft 6a is mounted so as to be rotatable with respect to the housing 11 via a first bearing element 14 and a second bearing element 24. In the present case, the first bearing element 14 is arranged in the area of a passage 15 through the housing cover 11a of the housing 11, through which the first output shaft 6a is guided out of the housing 11. Consequently, the first bearing element 14 is arranged in the housing cover 11a.

The rotor shaft 8 is mounted so as to be rotatable with respect to the housing 11, in the present case, via a third bearing element 25a, which is also arranged in the housing cover 11a, and a fourth bearing element 25b, which is arranged in the first housing segment 11b. The bearing elements 14, 24, 25a, 25b are grooved ball bearings in the present case, which transmit radial forces as well as axial forces. The selection and dimensioning of the bearing elements 14, 24, 25a, 25b takes place as a function of the arising loads and their direction of action in the drive device 2.

The collecting chamber 17 is essentially identical to the collecting chamber 17 according to FIG. 2. An essential difference in the present case is that a pump 16, particularly an oil pump, is arranged in the collecting chamber 17, which delivers the lubricant 21 collected in the collecting chamber 17 to suitable points within the housing 11. For the rest, the lubrication and/or cooling of the drive device 2 takes place similarly to FIG. 2. When certain elements or components of the drive device 2 are not sufficiently supplied with lubricant 21 due to the passive lubrication, further guide ducts 19 are formed in the housing 11.

It is explicitly mentioned here that appropriate sealing elements are provided at the housing 11, where necessary, which seal the housing cavity 12 with respect to an outer atmosphere. Due to the sealing elements (not shown here), in particular, the entry of moisture and/or dirt into the housing cavity 12 is prevented, as the result of which the service life of the bearing elements and/or of the rotating components is improved.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE CHARACTERS 1 vehicle
2 drive device
3 electric machine
4 input axis
5 gear stage
6a first output shaft
6b second output shaft
7 output axis
8 rotor shaft
9 first gearwheel of the gear stage
10 second gearwheel of the gear stage
11 housing
11a housing cover
11b first housing segment
11c second housing segment
12 housing cavity
13 differential
14 first bearing element
15 passage
16 pump
17 collecting chamber for coolant and/or lubricant
18 intermediate space
19 guide duct
20a first wheel
20b second wheel
21 lubricant
22 stator
23a first parting plane
23b second parting plane
23c third parting plane
24 second bearing element
25a third bearing element
25b fourth bearing element
25c fifth bearing element
25d sixth bearing element

The invention claimed is:

1. A drive device (2) for an at least partially electrically driven vehicle (1), comprising:
    an electric machine (3) having a rotor shaft (8) extending longitudinally along an input axis (4);
    a first output shaft (6a) extending longitudinally along an output axis (7), the output axis (7) being parallel to the rotor shaft (8);
    a gear stage (5) drivingly connecting the rotor shaft (8) to the first output shaft (6a), the gear stage (5) having a first gearwheel (9) rotationally fixed to the rotor shaft (8), and a second gearwheel (10) meshed with the first gearwheel (9) and drivingly connected to the first output shaft (6a); and
    a housing (11) having a shared housing cavity (12),
    wherein the first output shaft (6a) and the electric machine (3) are parallel to one another in the shared housing cavity (12), and
    wherein an air gap (18) extends radially between the electric machine (3) and the first output shaft (6a).

2. The drive device (2) of claim 1, further comprising:
    a second output shaft (6b); and
    a differential (13) drivingly connected to the rotor shaft (8) via the gear stage (5),
    wherein the differential (13) distributes drive power to the first output shaft (6a) and the second output shaft (6b).

3. The drive device (2) of claim 2, wherein the second gearwheel (10) of the gear stage (5) is a differential gear of the differential (13).

4. The drive device (2) of claim 1, further comprising a first bearing element (14) mounting the first output shaft (6a) in a passage (15) extending through the housing (11) such that the first output shaft (6a) is rotatable with respect to the housing (11).

5. The drive device (2) of claim 4, wherein the shared housing cavity (12) is spatially delimited by a housing cover (11a), wherein the first bearing element (14) is arranged at the housing cover (11a).

6. The drive device (2) of claim 1, further comprising a collecting chamber (17) for one or both of a coolant and a lubricant, the collecting chamber (17) being fluidically connected to the shared housing cavity (12).

7. The drive device (2) of claim 6, further comprising a pump (16) in the collecting chamber (17), the pump (16) delivering the one or both of the coolant and the lubricant.

8. The drive device (2) of claim 6, wherein the collecting chamber (17) is fluidically connected to at least one guide duct (19) of the housing (11).

9. The drive device (2) of claim 8, wherein the at least one guide duct (19) is formed by an internal shell of the housing (11) adjacent the first output shaft (6*a*).

10. A vehicle (1), comprising the drive device (2) of claim 1.

\* \* \* \* \*